(12) United States Patent
Chen (10) Patent No.: US 8,693,177 B2
(45) Date of Patent: Apr. 8, 2014

(54) HINGE MECHANISM AND FOLDABLE ERGONOMIC KEYBOARD USING THE SAME

(75) Inventor: Fu-Kuang Chen, Taoyuan County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 97 days.

(21) Appl. No.: 13/523,825

(22) Filed: Jun. 14, 2012

(65) Prior Publication Data

US 2013/0242488 A1    Sep. 19, 2013

(30) Foreign Application Priority Data

Mar. 16, 2012    (CN) .......................... 2012 1 0069006

(51) Int. Cl.
  *H05K 5/00*    (2006.01)
  *H05K 7/00*    (2006.01)
  *G06F 1/16*    (2006.01)
(52) U.S. Cl.
  USPC ............. 361/679.15; 361/679.14; 361/679.16
(58) Field of Classification Search
  USPC ............... 361/679.11, 679.12, 679.14, 69.15, 361/679.16, 679.17; 400/472, 492, 667, 400/676
  See application file for complete search history.

(56) References Cited

U.S. PATENT DOCUMENTS

| | | | | |
|---|---|---|---|---|
| 5,712,760 | A * | 1/1998 | Coulon et al. | 361/679.15 |
| 6,556,430 | B2 * | 4/2003 | Kuo et al. | 361/679.09 |
| 6,793,421 | B1 * | 9/2004 | Baldwin et al. | 400/488 |
| 7,764,481 | B2 * | 7/2010 | Kijima | 361/117 |
| 7,828,489 | B1 | 11/2010 | Hargreaves | |
| 2002/0033761 | A1 * | 3/2002 | Katakami et al. | 341/22 |
| 2004/0052044 | A1 * | 3/2004 | Mochizuki et al. | 361/683 |
| 2004/0061683 | A1 * | 4/2004 | Mochizuki et al. | 345/168 |
| 2010/0041439 | A1 * | 2/2010 | Bullister | 455/566 |
| 2010/0245250 | A1 | 9/2010 | Linegar | |
| 2013/0027865 | A1 * | 1/2013 | Ge et al. | 361/679.16 |

* cited by examiner

*Primary Examiner* — Anthony Haughton
(74) *Attorney, Agent, or Firm* — Li & Cai Intellectual Property (USA) Office (57) ABSTRACT

A hinge mechanism and a foldable ergonomic keyboard having the same are disclosed. The hinge mechanism includes a pair of operating modules and a linking unit. Each operating module has an accommodating housing, a locking assembly received in the accommodating housing, a latch member connected to one end of the accommodating housing for controlling a displacement of the locking assembly, and a spherical member received in the accommodating housing. The other end of the accommodating housing is formed with a positioning slot. The linking unit has two ends respectively passed through the positioning slots and connected to the spherical members. The hinge mechanism connects two input sections via the accommodating housings, and the latch member can selectively arranged to press tightly the spherical member in the accommodating housing or release the spherical member. Thus, the two input sections can be adjusted in different postures or folded condition.

17 Claims, 11 Drawing Sheets

HINGE MECHANISM AND FOLDABLE ERGONOMIC KEYBOARD USING THE SAME

BACKGROUND OF THE INVENTION

1. Field of the Invention

The present invention is related to a hinge mechanism. In particular, the present disclosure relates to a hinge mechanism and a foldable ergonomic keyboard utilizing the hinge mechanism to connect two input sections thereof, so that the keyboard can be adjusted to any ergonomic posture and is conveniently stored up.

2. Description of Related Art

Keyboard has been popularly applied as an input device of computers. Most conventional keyboards have board-shaped structures without operating posture adjustability. User's hands are forced to adapt to the keyboards and may be twisted during the entire operating duration. This non-ergonomic design often causes un-comfort to the users and may even result in injury.

To improve keyboard with ergonomic considerations, there are conventional patents, for example U.S. Pat. No. 7,828,489 and US 2010/0245250. U.S. Pat. No. 7,828,489 disclosed a keyboard which is divided into two input parts, and arranged a support with adjusting mechanism under the keyboard to uplift the inner sides of the two input parts. However, the inner sides of the two input parts can only be adjusted in parallel condition and cannot be expanded as fan-shape. Therefore, user's two hands and arms are still twisted and not ergonomic completely. US 2010/0245250 also divided a keyboard into two keyboard segments, which are attached to one another at top portion by a hinge or a joint such that segments are mutually pivotable. A base support with adjusting mechanism is still arranged under the keyboard, which caused the similar disadvantages as the above prior art. The base support resulted in a complex structure on the bottom side of the keyboard and the cost is raised. Besides, the two above conventional keyboards cannot be folded and are not easily to transport or store up.

Therefore, it is desirable to propose a novel ergonomic keyboard to overcome the above-mentioned problems.

SUMMARY OF THE INVENTION

The instant disclosure provides a hinge mechanism and a foldable ergonomic keyboard having the same, wherein the hinge mechanism is utilized to adjust the ergonomic keyboard to an ergonomic posture or a folded condition, so that the ergonomic keyboard has both comfortable operation and convenient storage.

In order to achieve the above objectives, the instant disclosure is to provide a hinge mechanism. The hinge mechanism includes a pair of operating modules and a linking unit. Each of the operating modules has an accommodating housing formed with an opening end and a linking end, a locking assembly received in the accommodating housing, a latch member rotatably connected in the opening end of the accommodating housing for controlling the displacement of the locking assembly, and a spherical member received in the accommodating housing and contacted the locking assembly. The pair of accommodating housings is respectively connected with the two input sections. Each linking end of the accommodating housing forms a positioning slot. The linking unit has two ends which are respectively passed through the positioning slot of the linking end and connected to the spherical member.

The latch member is selectively arranged in a squeezed position or an adjusting position. The locking assembly following the squeezed position of the latch member presses tightly to fix the spherical member in the accommodating housing, or following the adjusting position of the latch member to release the spherical member.

To achieve the above mentioned, the present disclosure further provides a foldable ergonomic keyboard including a first input section, a second input section and a hinge mechanism. The hinge mechanism connects two input sections of the foldable ergonomic keyboard. The first input section and the second input section have a first and second plurality of keys respectively. The hinge mechanism includes a pair of operating modules and a linking unit. Each operating module has an accommodating housing formed with an opening end and a linking end, a locking assembly received the accommodating housing, a latch member rotatably connected the opening end of the accommodating housing to control the displacement of the locking assembly, and a spherical member received in the accommodating housing and contacted the locking assembly. The two accommodating housings are respectively connected with the first input section and the second input section. The linking end of the accommodating housings forms a positioning slot respectively. The linking unit has two ends respectively passed through the positioning slots of the linking ends and connected to the pair of spherical members.

The latch member is selectively arranged in a squeezed position or an adjusting position. The locking assembly following the squeezed position of the latch member presses tightly to fix the spherical member in the accommodating housing for staying a posture of the keyboard, or following the adjusting position of the latch member to release the spherical member for adjusting the posture of the keyboard.

Thus, the instant disclosure has advantages as followed. The hinge mechanism is utilized to adjust the keyboard in postures more ergonomically. The structure is more simplified than conventional art, without any support structure under the keyboard. Further, the hinge mechanism could make the first input section and the second input section foldable for carrying and storing conveniently.

For further understanding of the instant disclosure, reference is made to the following detailed description illustrating the embodiments and examples of the instant disclosure. The description is for illustrative purpose only and is not intended to limit the scope of the claim.

DETAILED DESCRIPTION OF THE PREFERRED EMBODIMENTS

Figure 1:
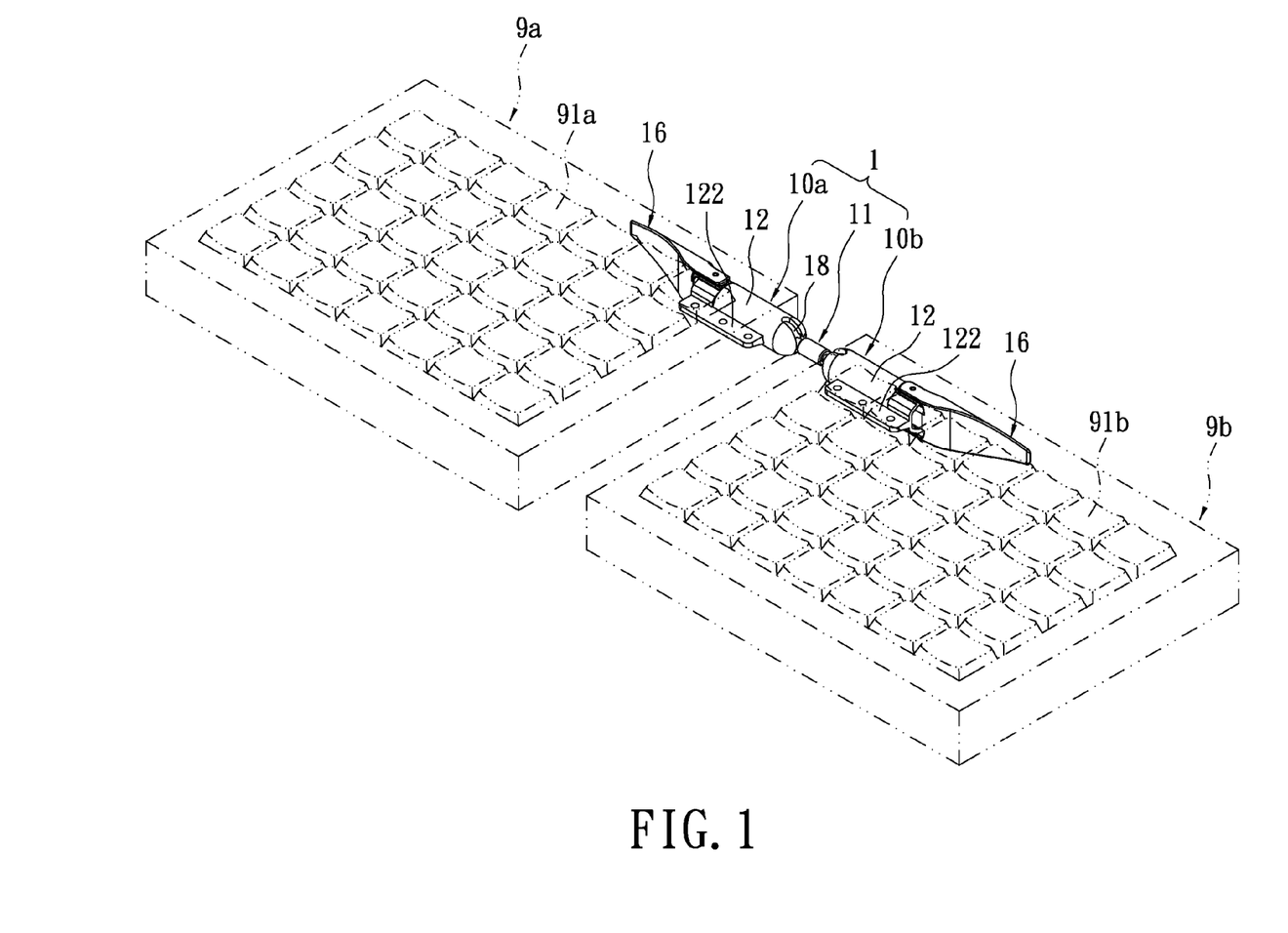
FIG. 1 is a perspective view of a foldable ergonomic keyboard according to the present disclosure.

Please refer to FIG. 1, which is a perspective view of a foldable ergonomic keyboard of the present disclosure. The foldable ergonomic keyboard includes a first input section 9a, a second input section 9b and a hinge mechanism 1 used to connect the two input sections 9a, 9b. The size of the first input section 9a and the second input section 9b are substantial equal, and have a plurality of keys 91a, 91b respectively. The keys 91a, 91b can be like the structure of common desktop keyboard, or like notebook computer with a slim size.

However, the hinge mechanism of the present disclosure also can be applied to any foldable device with two divided half segments, for example, a rod-like device or a board-like device. It just takes the first input section and the second input section as a first segment and a second segment, so that any device having two half segments can be adjusted or folded for transport or storage. Besides, the size of the hinge mechanism is not limited therefor.

The hinge mechanism 1 includes a pair of operating modules 10a, 10b, and a linking unit 11 to connect the pair of operating modules 10a, 10b. In this embodiment, the pair of operating modules 10a, 10b is respectively fixed to a top edge of the first input section 9a and the second input section 9b, and is partially exposed outside an inner side of the inner top corner of the first input section 9a and the second input section 9b.

Figure 2:
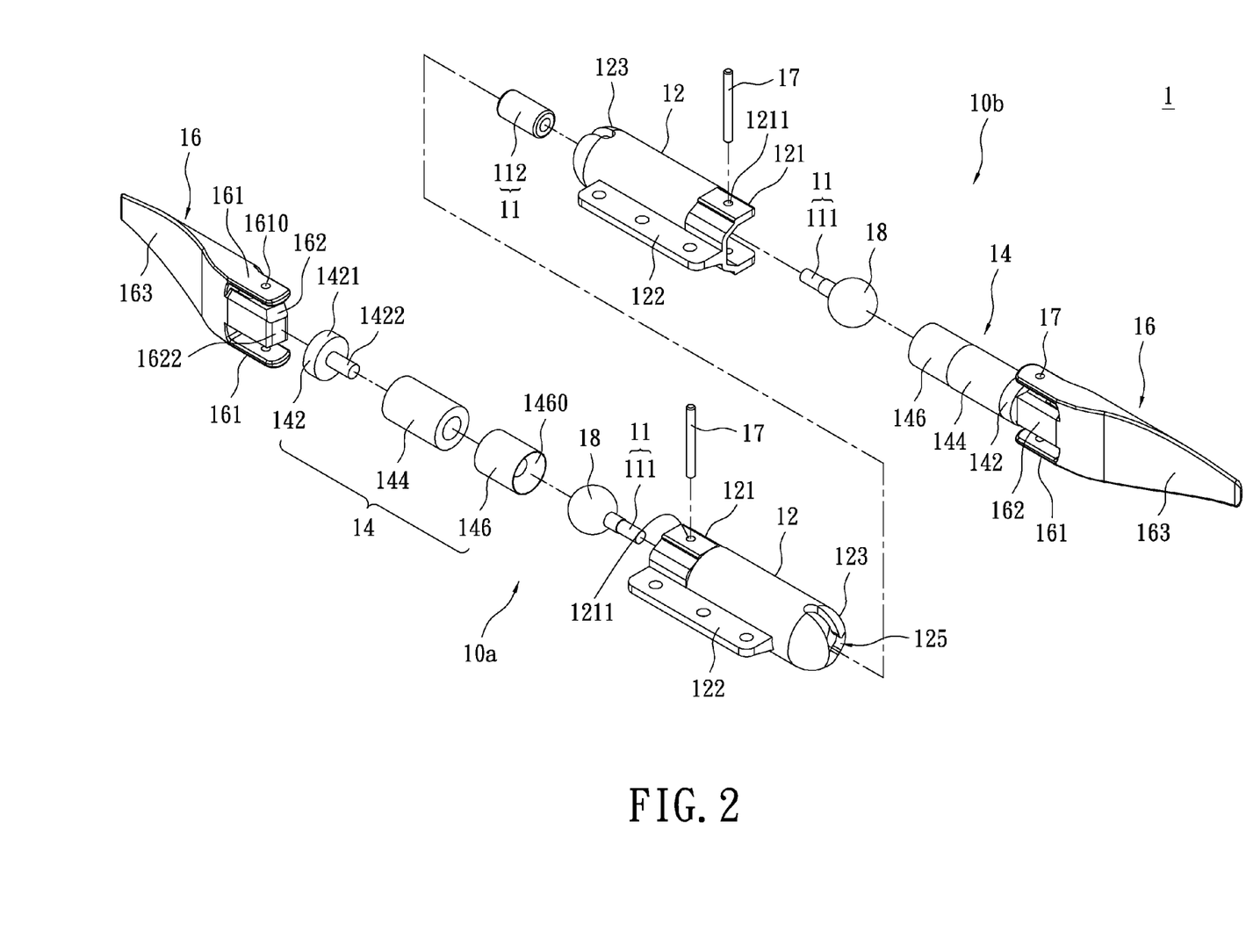
FIG. 2 is an exploded view of a hinge mechanism according to the present disclosure.
Figure 3:
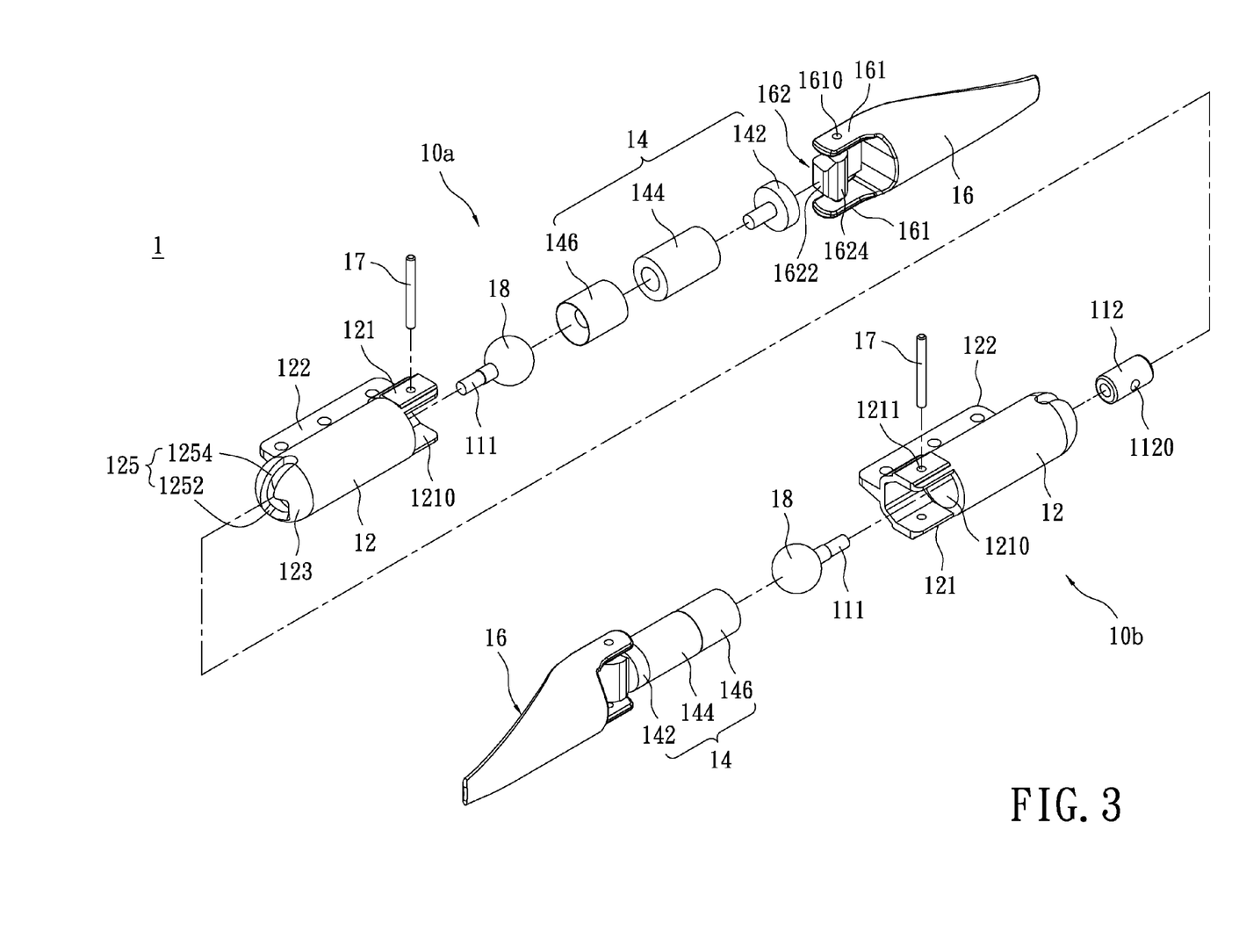
FIG. 3 is another perspective view of the hinge mechanism according to the present disclosure.

Please refer to FIG. 2 and FIG. 3, which are different perspective exploded views of the hinge mechanism according to the present disclosure. Each of the operating modules 10a, 10b has an accommodating housing 12, a locking assembly 14, a latch member 16 and a spherical member 18. The accommodating housing 12 has an opening end 121 and a linking end 123. The locking assembly 14 is received in the accommodating housing 12. The latch member 16 has one end is pivotably connected to the opening end 121 of the accommodating housing 12 and control the displacement of the locking assembly 14. The spherical member 18 is accommodated in the accommodating housing 12 and contacts the locking assembly 14. The two spherical members 18 of the operating modules 10a, 10b are connected via the linking unit 11. The detail of above mentioned elements are described as follows.

The pair of accommodating housings 12 is connected to the first input section 9a and the second input section 9b respectively. In this embodiment, each of the accommodating housings 12 has a fixed board 122 formed at an outer edge thereof, which is fixed to the first input section 9a and the second input section 9b, respectively. The extending direction of the fixed board 122 is parallel to that of the input sections 9a, 9b. The fix way between the fixed boards 122 and the input sections 9a, 9b can be screwed, but it is not limited thereto.

Please refer to FIG. 3. The opening end 121 of the accommodating housing 12 has a pair of apertures 1211 for pivotably connecting the latch member 16, and an adjusting cutout 1210 formed opposite to the fixed board 122, so that the opening end 121 is U-shaped. The adjusting cutout 1210 is toward a top edge of the first input section 9a and the second input section 9b. The adjusting cutout 1210 can allow the latch member 16 to rotate until a position perpendicular to the accommodating housing 12, and the detail will be described later. Each linking end 123 of the accommodating housing 12 has a positioning slot 125 formed thereon.

Figure 4:
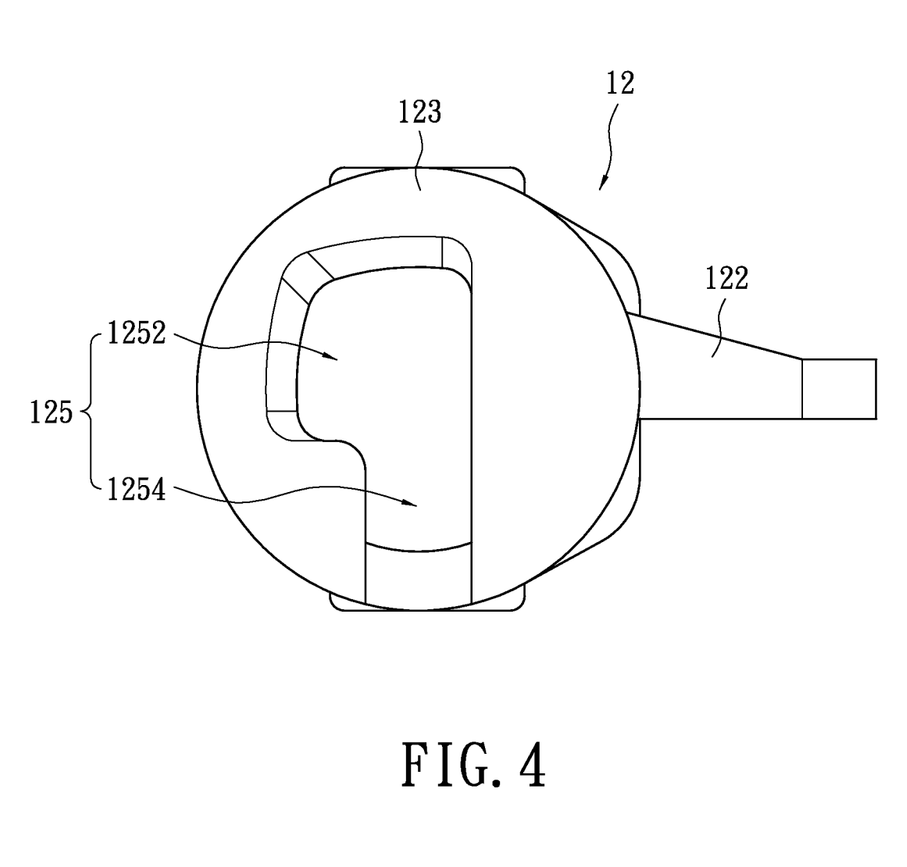
FIG. 4 is a front view of an accommodating housing of the hinge mechanism according to the present disclosure.

Concerning the linking end 123 and the positioning slot 125 of the accommodating housing 12, please refer to FIG. 4, which is a front view of the accommodating housing of the hinge mechanism. The linking end 123 of the accommodating housing 12 has a hemispherical shape. The positioning slot 125 has a positional part 1252 passing through a top point of the hemispherical shaped linking end 123 and extending far away the fixed board 122, and a folding part 1254 communicated with the positional part 1252. The positional part 1252 is substantially square-shaped, and the folding part 1254 is strip-shaped. The folding part 1254 is formed on a spherical curve of the linking end 123 and extended in a direction perpendicular to the fixed board 122. In this embodiment, the folding part 1254 extended to an edge of the hemispherical shaped linking end 123, which closed to a periphery of the accommodating housing 12.

The linking unit 11 preferably is made of metal to enhance its strength. Two ends of the linking unit 11 passed through the pair of positioning slots 125 and connected to the pair of spherical members 18, respectively. In this embodiment, the linking unit 11 includes a pair of linking rods 111 respectively connected to the pair of spherical members 18, and a linking tube 112 connected the pair of linking rods 111. The linking rod 111 and the spherical member 18 preferably are integrally formed into one piece structure, such as, it can be a metal piece formed by lathing or molding, or a hard plastic, but not limited thereto. The connecting way of the linking tube 112 and the pair of linking rods 111 can be tight engagement, soldering, wedging, embedding, or screwing . . . etc. In this embodiment, as shown in FIG. 3, the linking tube 112 has a screw hole 1120 for a screw fixing the pair of linking rods 111 to the linking tube 112. Furthermore, a width of the folding part 1254 is substantially equal to a diameter of the linking rod 111 of the linking unit 11. A width of the positional part 1252 is larger than a diameter of the linking rod 111 of the linking unit 11 and limits the rotating range of the linking unit 11 about in 30 degrees. Therefore, two ends of the linking unit 11 passed through the pair of positioning slots 125 via the linking rods 111 and connected to the pair of spherical members 18, respectively.

Figure 5:
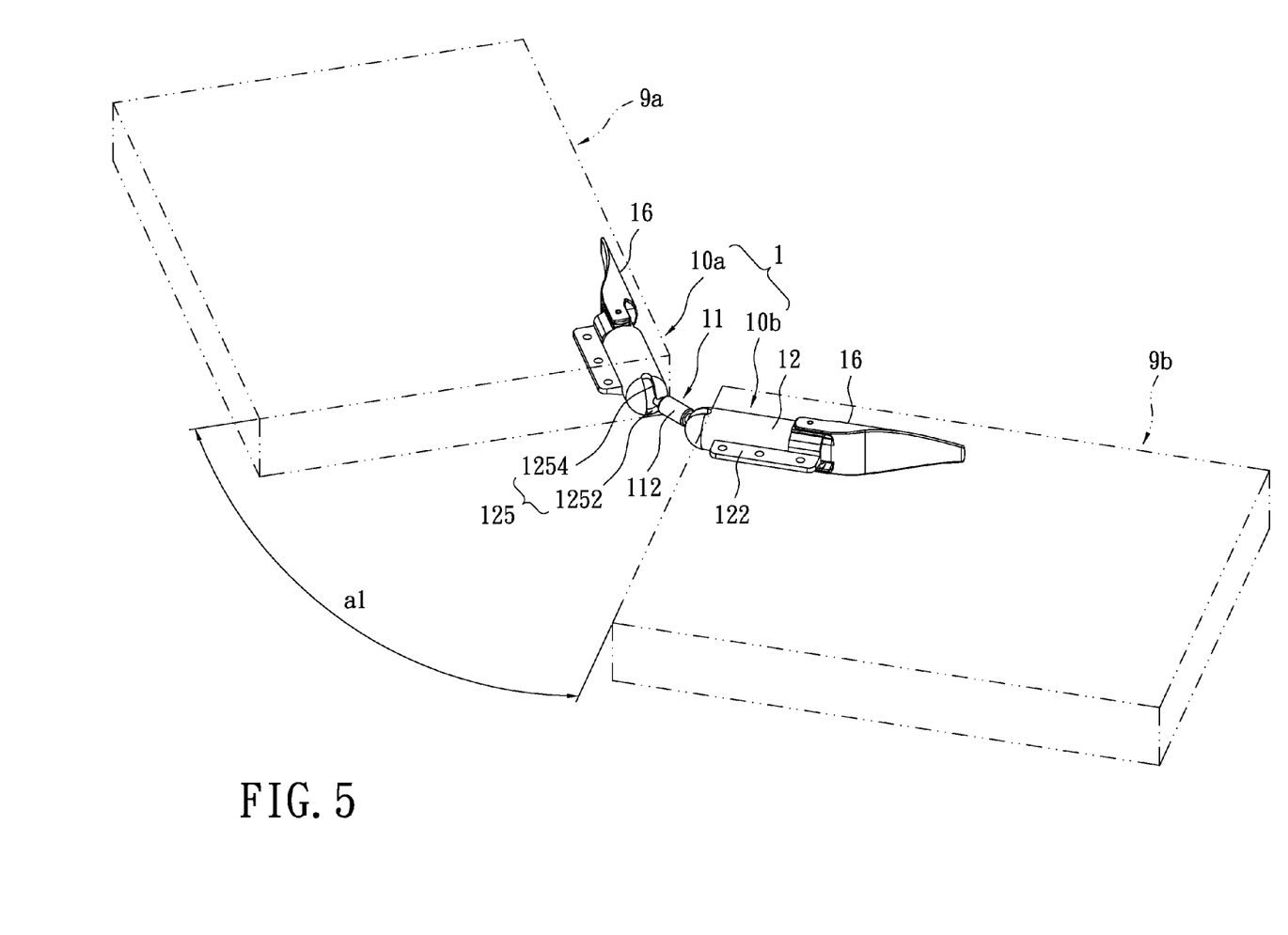
FIG. 5 is a perspective view of foldable ergonomic keyboard in expanding condition according to the present disclosure.

Please refer to FIG. 5, the linking unit 11 and the pair of spherical members 18 are formation of dumbbell-shaped after assembly. The linking tube 112 is arranged outside the positioning slot 125, the linking rods 111 are passed through the positioning slot 125 and can be moved therein. By moving the linking unit 11 at different locations within the positioning slot 125, such as at the positional part 1252 or the folding part 1254. The pair of accommodating housing 12 can be arranged in different forms, for example, I-shaped, or U-shaped, and then the posture of the first input section 9a and the second input section 9b are adjustable, which will be introduced in detail later.

Refer to FIGS. 2 and 3. In this embodiment, the locking assembly 14 includes a pushing piece 142, a sleeve 144 and an elastic pressing piece 146. The pushing piece 142 has one end formed a smooth portion 1421, and the other end formed a post portion 1422. One end of the latch member 16 is against the smooth portion 1421 of the pushing piece 142. The post portion 1422 of the pushing piece 142 is inserted into the sleeve 144, and the sleeve 144 is against the pressing piece 146. One end of the pressing piece 146, which far away the sleeve 144, is formed with a spherical cavity 1460 for partially receiving the spherical member 18. The pushing piece 142 and the sleeve 144 are made of rigid material, such as reinforced plastics (polyformaldehyde, POM), Teflon . . . etc, which has advantage of small coefficient of friction, good wear resistance, ideal stable size. When the latch member 16 is parallel to the locking assembly 14, the spherical member 18 and the accommodating housing 12, the latch member 16 pushes the pushing piece 142 and the sleeve 144. Then, the pressing piece 146 is pushed by the sleeve 144 and deformed to hold tightly the spherical member 18, so that the spherical member 18 is fixed in the accommodating housing 12 and not movable. This condition is defined as squeezed position.

A supplement description of this embodiment, the design of the pushing piece 142 divided from the sleeve 144 is benefit of material-reduced and less weight. However, the pushing piece 142 and the sleeve 144 can be one piece.

In this embodiment, one end of the latch member 16 forms a handle portion 163, and the other is pivotably connected to the opening end 121 of the accommodating housing 12. The handle portion 163 can be held by use to hold the latch member 16. The latch member 16 has a pressing bump 162 formed on an end of the handle portion 163 toward the accommodating housing 12, and a pair of pivotal boards 161 formed at two sides of the pressing bump 162. The pressing bump 162 is substantial P-shaped and is fixed at one end of the handle portion 163, which is contacted with the pushing piece 142.

The following introduces detail of the latch member 16 to pivotably connect the accommodating housing 12. In this embodiment, the pair of pivotal boards 161 is respectively formed with a pivotal hole 1610 correspondingly. Besides, the pressing bump 162 has an aperture formed through two ends thereof (not shown) corresponding to the pair of pivotal boards 161. Alternatively, the pressing bump 162 can forms a pair of cavities (not shown) corresponding to the pair of pivotal boards 161. In this embodiment, the pressing bump 162 is arranged in the adjusting cutout 1210. A pin 17 is used to insert into the pivotal holes 1610 of the pair of pivotal boards 161, the apertures 1211 formed on the opening end 121 of the accommodating housing 12, and the aperture of the pressing bump 162, so that the latch member 16 can pivotably connect to the accommodating housing 12. Further, in another embodiment, a pair of post portions (not shown) can be arranged on the pair of pivotal boards 161 respectively to pivotably connect to the apertures 1211 formed on the opening end 121 of the accommodating housing 12. Also, a pair of post portions (not shown) can be arranged on the opening end 121 of the accommodating housing 12 to pivotably connect to the pivotal holes 1610 of the pivotal boards 161, and the pin 17 is omitted. However, the above mentioned about the pivotal boards, the opening end of the accommodating housing and the pressing bump are only illustrated as examples, which is not used to limit the present disclosure, any pivotal structure can be applied in this present disclosure.

Figure 3A:
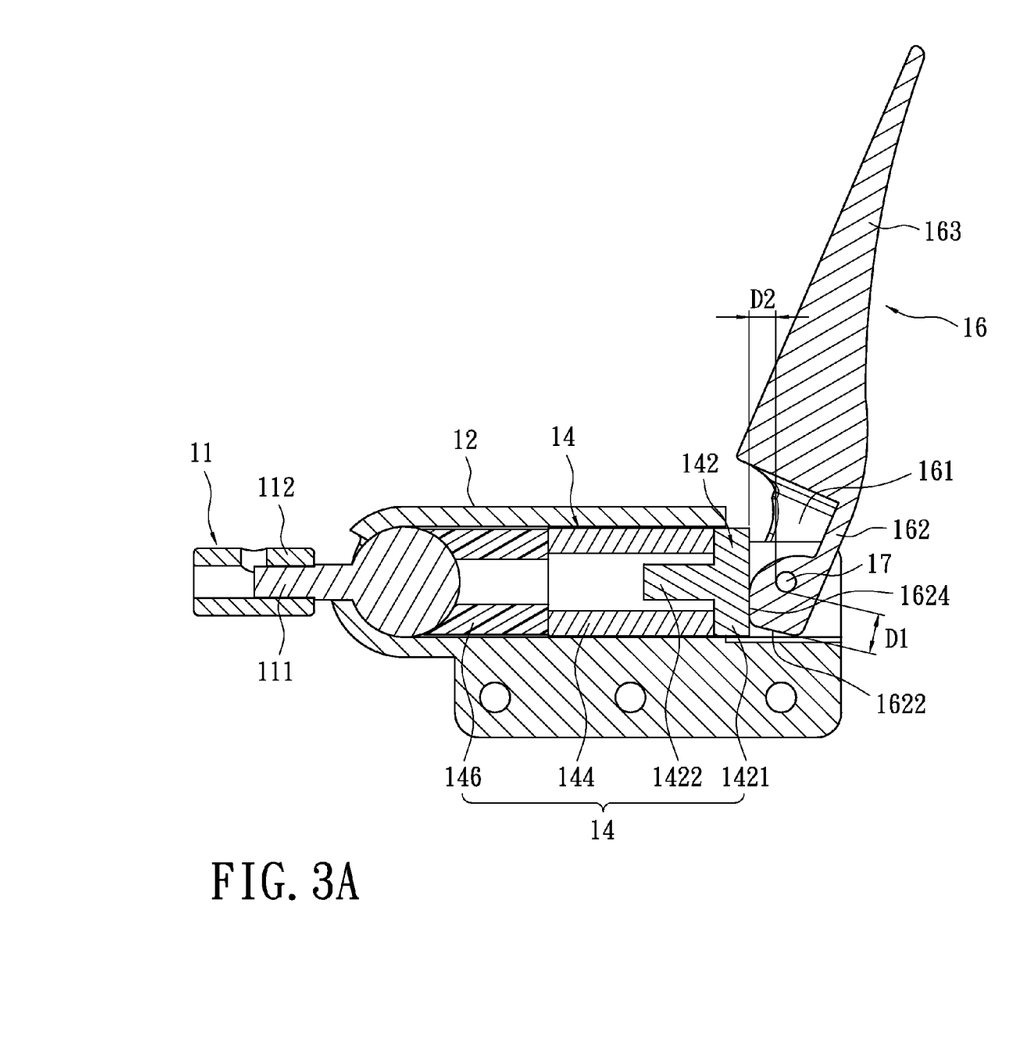
FIG. 3A is a cross-sectional view of the hinge mechanism in an adjusting condition according to the present disclosure.
Figure 3B:
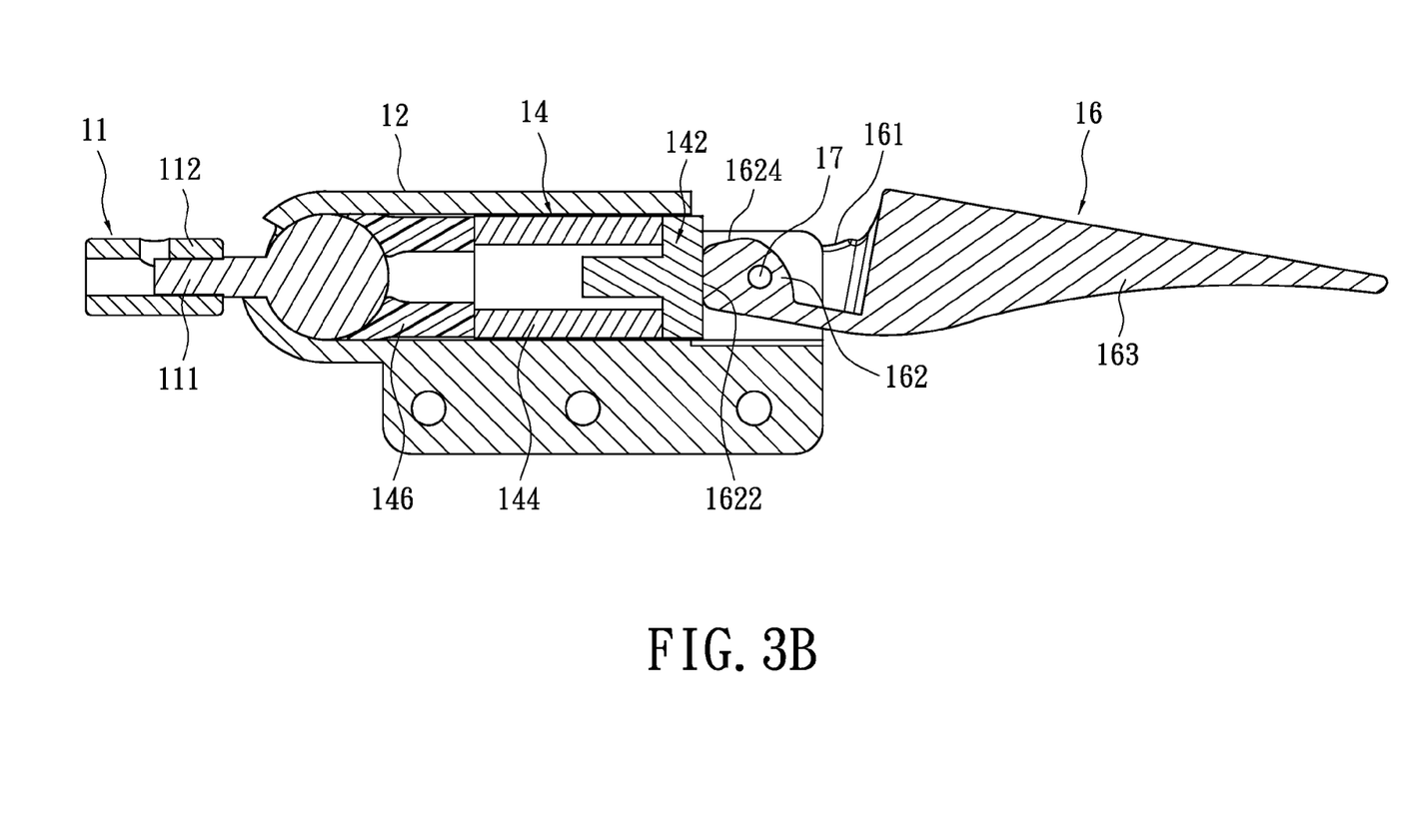
FIG. 3B is a cross-sectional view of the hinge mechanism in a squeezed condition according to the present disclosure.

Please refer to FIG. 2 and FIG. 3, the pressing bump 162 has a pressing surface 1622 and an adjusting surface 1624. The pressing surface 1622 is formed on an end of the pressing bump 162 opposite to the handle portion 163 and perpendicular to a longitudinal direction of the latch member 16. The adjusting surface 1624 is formed on an outside of the pressing bump 162 and parallel to the longitudinal direction of the latch member 16. As shown in FIG. 3A and FIG. 3B, when the latch member 16 is rotated, the pressing bump 162 will rotate along the pin 17 as an axle and following the latch member 16. The pressing surface 1622 and the adjusting surface 1624 have different radius away from the pin 17. As shown in FIG. 3A, a distance D1 between the pressing surface 1622 and the pin 17 is larger than a distance D2 between the adjusting surface 1624 and the pin 17. Therefore, the pressing bump 162 is functioned as a cam. The locking assembly 14 is tightly pressed, when the pressing surface 1622 is turned to face the locking assembly 14. The locking assembly 14 is loosened, when the adjusting surface 1624 is turned to face the locking assembly 14.

Refer to FIG. 3A and FIG. 3B, the present disclosure utilizes the latch member 16 to selectively arrange in a squeezed position (as shown in FIG. 3B) or an adjusting position (as shown in FIG. 3A). In the squeezed position, as shown in FIG. 3B, the latch member 16 is substantially parallel to the accommodating housing 12, meanwhile, the pressing surface 1622 is against the pushing piece 142 of the locking assembly 14 to press the locking assembly 14. In the adjusting position, as shown in FIG. 3A, contrary to the squeezed position, the latch member 16 is made to turn a predetermined angle such as 30-90 degrees. In this embodiment, the latch member 16 is substantially perpendicular to the accommodating housing 12. In other words, the latch member 16 is expanded outward and is rotated to a position about perpendicular to the accommodating housing 12. At that time, the adjusting surface 1624 is against the pushing piece 142 of the locking assembly 14 to loosen the locking assembly 14.

In this embodiment, the locking assembly 14 can press the spherical member 18 tightly in the accommodating housing 12 while the latch member 16 is in the squeezed position, so that the spherical member 18 cannot move in the accommodating housing 12. Alternatively, the locking assembly 14 can withdraw to loosen the spherical member 18 while the latch member 16 is in the adjusting position, so that the spherical member 18 can rotate in the accommodating housing 12. At that time, the pair of operating modules 10a, 10b can be arranged in various postures with different included angles through the linking unit 11. After adjustment, the latch member 16 is turned back to the squeezed position, and the locking assembly 14 is pushed to press the spherical member 18 tightly in the accommodating housing 12, so that the pair of operating modules 10a, 10b are retained and fixed in the particular included angle (posture).

Through the hinge mechanism 1, the foldable ergonomic keyboard of the present disclosure can be adjusted in an ergonomic posture. In the initial condition of keyboard, as shown in FIG. 1, the first input section 9a and the second input section 9b are disposed in a substantially flat horizontal condition and contiguous to each other. The pair of accommodating housings 12 is fixed at an inside corner on the top edge of the first input section 9a and the second input section 9b. Meanwhile, the latch members 16 and the accommodating housings 12 are arranged in a linear condition, and the linking unit 11 is positioned adjacent to an outermost point of the hemispherical linking end 123 (refer to FIG. 4, that is an adjoined point of the positional part 1252 and the folding part 1254).

When user want to adjust the included angle between the first input section 9a and the second input section 9b, the pair of latch members 16 are rotated and removed from the first input section 9a and the second input section 9b, and turned into the adjusting cutout 1210. In other words, the latch members 16 are rotated toward the outside of the keyboard unto the adjusting position.

Please refer to FIG. 4 and FIG. 5. The accommodating housing 12 at right side in FIG. 5 is connected to the second input section 9b, and the second input section 9b in FIG. 5 is arranged in a horizontal condition. First, to set the pair of latch members 16 in adjusting position. Since the positional part 1252 is extended away from the fixed board 122, the linking unit 11 at left side in FIG. 5 is moved in the positional part 1252 and closed to the folding part 1254. Therefore, the first input section 9a connected to the accommodating housing 12 can depart from the second input section 9b along a horizontal direction in FIG. 5, that is toward the left side in FIG. 5. After this adjustment, the first input section 9a and the second input section 9b both are disposed horizontally on a level (as shown in FIG. 5). The included angle a1 between the input sections 9a, 9b can be expanded by about 0-30 degrees. Such expanded angle allows user's palm and arm to dispose in a natural linear gesture for fitting the ergonomics of two hands with comfortable usage of keyboard. Then, to turn the pair of latch members 16 back to the squeezed position, then the pair of spherical members 18 are fixed in the pair of accommodating housings 12 and the linking unit 11 is arranged in the positional part 1252 adjacent to the folding part 1254. Therefore, the keyboard is restrained and fixed in the expanded posture with the included angle a1.

Figure 6:
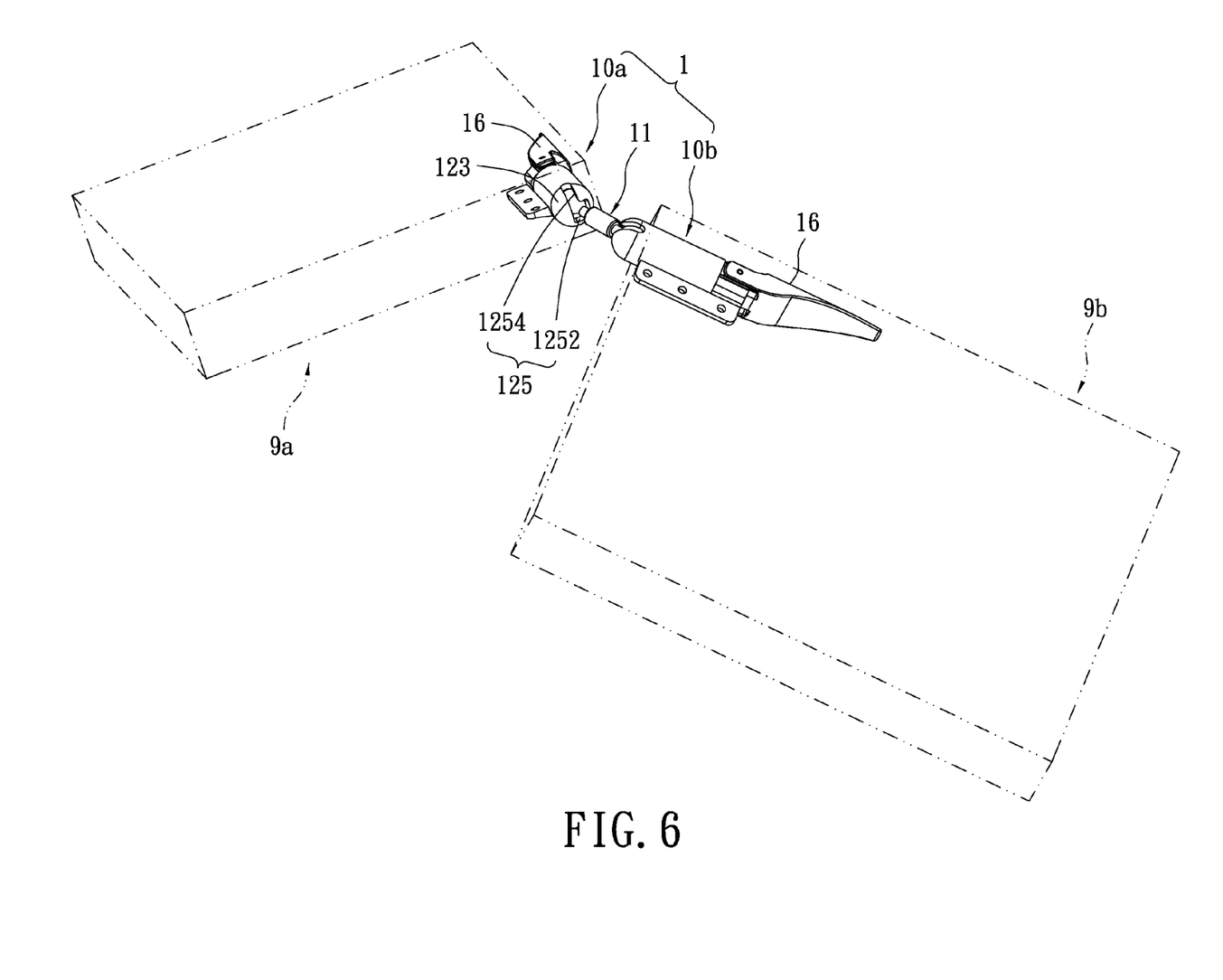
FIG. 6 is a perspective view of the foldable ergonomic keyboard in another expanding condition according to the present disclosure.
Figure 6A:
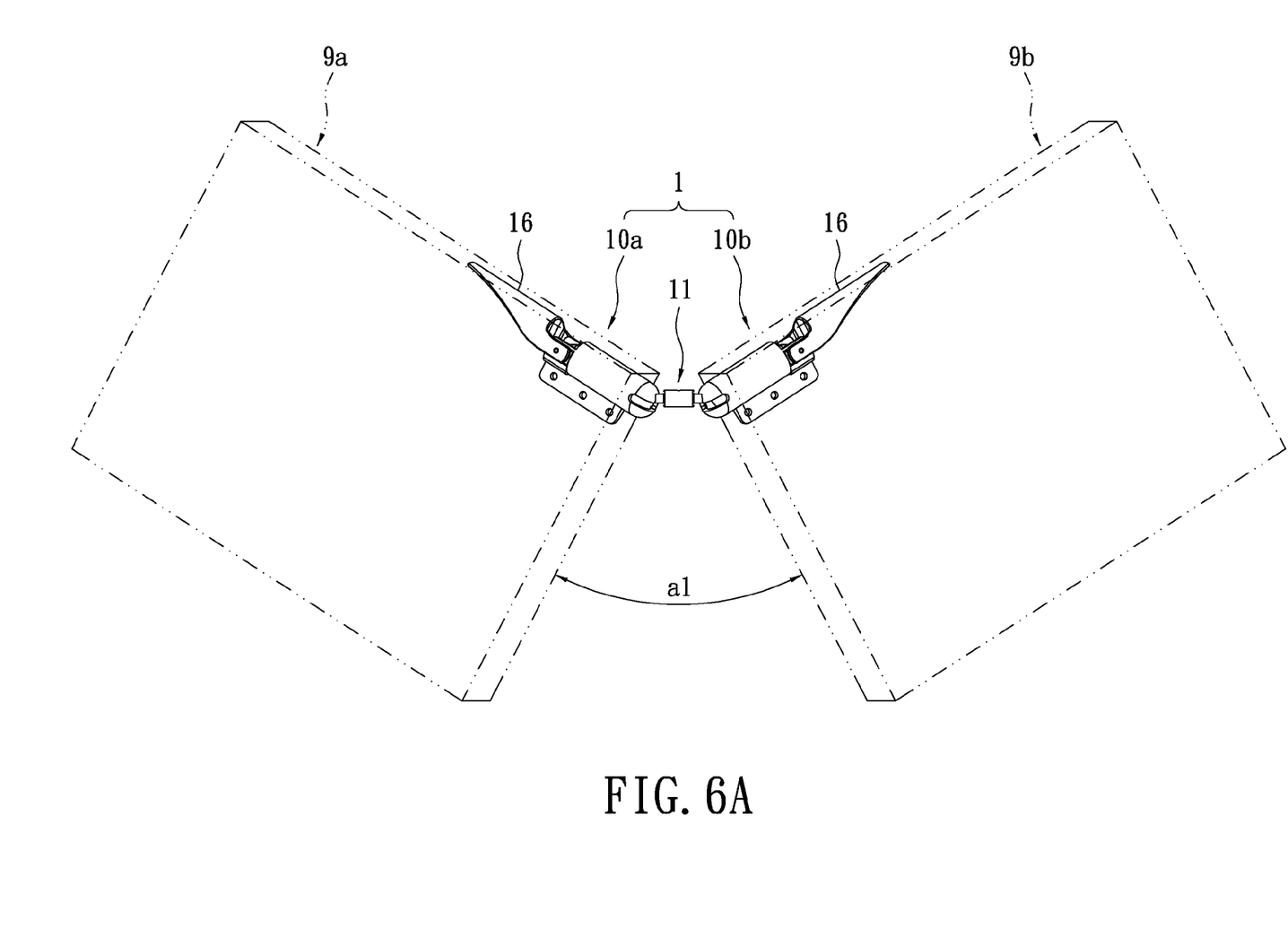
FIG. 6A is a top view of FIG. 6.
Figure 6B:
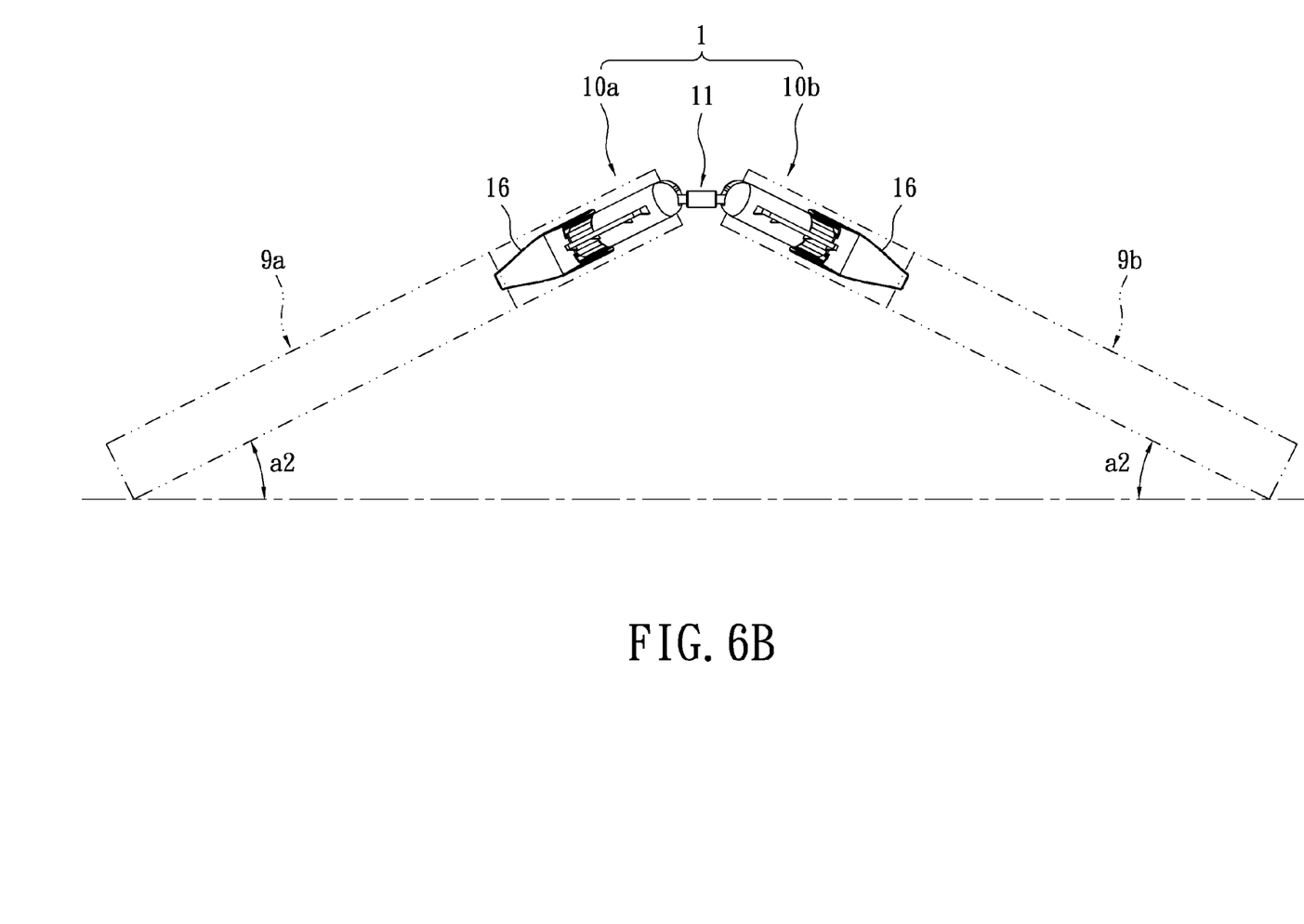
FIG. 6B is a front view of FIG. 6.

Please refer to FIG. 6 to FIG. 6B, the present disclosure allows the keyboard to be adjusted more and more ergonomically by user. Besides the included angle a1 between the two input sections 9a, 9b, the linking unit 11 in the positional part 1252 are still able to adjust departed from the folding part 1254, in which the inner top edges of the first input section 9a and the second input section 9b are uplifted. In this posture, as shown in FIG. 6, the two input sections 9a, 9b are not only adjusted with one included angle a1 about 30 degrees (as shown in FIG. 6A of top view), but also the inner edges of the two input sections 9a, 9b are uplifted with an included angle a2 (as shown in FIG. 6B of front view). The included angle a2 between the input sections 9a, 9b and the horizontal plane is also able to adjust according to user's requirement, such as about 0-30 degrees. In such included angle, the inner sides of use's palms are not forced to lie on the tabletop with a more ergonomic posture for two hands.

Figure 7:
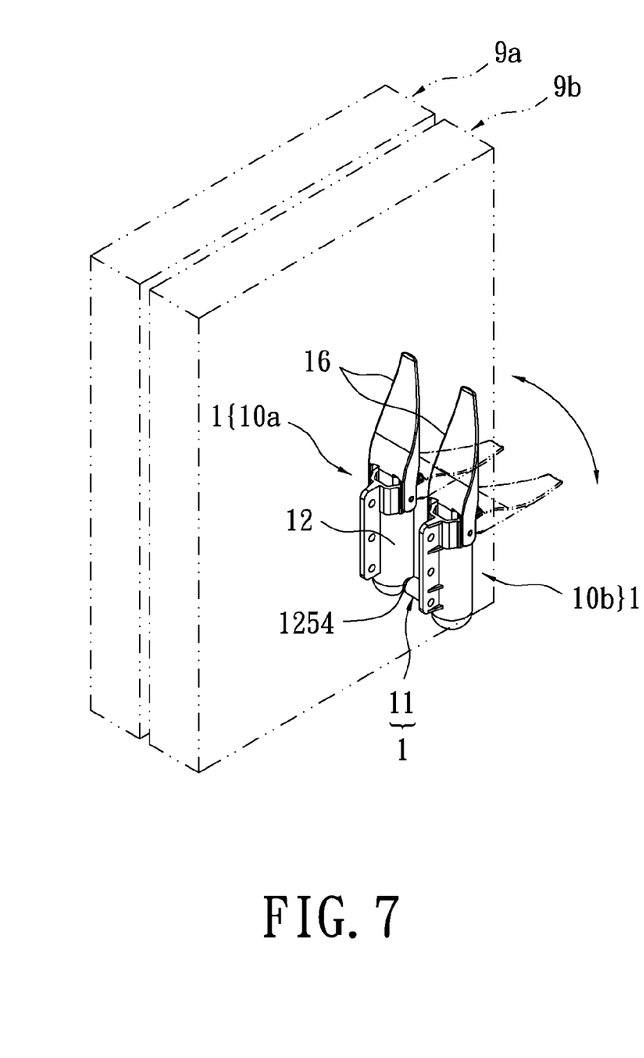
FIG. 7 a perspective view of the foldable ergonomic keyboard in a folding condition according to the present disclosure.

Please refer to FIG. 7. One more is deserved to be mentioned, the foldable ergonomic keyboard of the present disclosure can adjust the first input section 9a and the second input section 9b in folded condition by the hinge mechanism 1 for convenient storage. In this embodiment, because the folding part 1254 is extended to an edge of the hemispherical linking end 123, the linking unit 11 can remove to an end of the folding part 1254, that is the end far away the positional part 1252, until the linking unit 11 are perpendicular to the pair of operating modules 10a, 10b. In other words, the hinge mechanism 1 is turned out to have an U-shaped form. In the meanwhile, the keys 91a, 91b of the first input section 9a and the second input section 9b face to each other and are arranged in an inner side thereof, so that the dust is avoided to enter into the keyboard.

Comparing with the prior art, the present disclosure just only uses the hinge mechanism 1, and the keyboard can be adjusted in various ergonomic postures. The present disclosure does not additionally require a support with adjusting mechanism arranged under the keyboard, and the space and cost are reduced more and more. Further, the foldable ergonomic keyboard of the present disclosure is able to adjust not only in comfortable operating postures, but also in folded condition of the first input section 9a and the second input section 9b for both easy carrying and convenient storage.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A foldable ergonomic keyboard, comprising:
a first input section having a first plurality of keys;
a second input section having a second plurality of keys; and
a hinge mechanism adjustably connecting the first and the second input sections, including:
a pair of operating modules, each of operating module having accommodating housing formed with an opening end and a linking end, a locking assembly received in the accommodating housing, a latch member pivotably connected to the opening end of the accommodating housing and against the locking assembly to control a displacement of the locking assembly, and a spherical member accommodated in the accommodating housing and against the locking assembly, wherein the pair of accommodating housings are respectively connected to the first input section and the second input section, each the linking end of the accommodating housing is formed with a positioning slot; and
a linking unit, having two ends passing through the positioning slots of the linking ends and connecting to the pair of spherical members respectively;
wherein the latch member is selectively arranged in a squeezed position and an adjusting position, the locking assembly following with the squeezed position of the latch member to press tightly the spherical member fixed in the accommodating housing for staying a posture of the keyboard, the locking assembly following with the adjusting position of the latch member to loosen the spherical member for adjusting the posture of the keyboard.

2. The foldable ergonomic keyboard as claimed in claim 1, wherein the pair of operating modules are respectively fixed to a top edge of the first input section and the second input section, and partially exposed outside an inner edge corner of the first input section and the second input section.

3. The foldable ergonomic keyboard as claimed in claim 2, wherein the pair of the accommodating housings respectively has a fixed board disposed at a periphery thereof to connect with the first input section and the second input section.

4. The foldable ergonomic keyboard as claimed in claim 3, wherein the linking ends of the accommodating housings are hemispherical shaped, the positioning slot has a positional part passing through a top point of the hemispherical shaped linking end and extending far away the fixed board, and a folding part communicated with the positional part, the folding part is formed on a spherical curve of the linking end and extended in a direction perpendicular to the fixed board.

5. The foldable ergonomic keyboard as claimed in claim 1, wherein each of the latch members includes:
a handle portion;
a pressing bump formed on an end of the handle portion toward the accommodating housing; and
a pair of pivotal boards formed at two sides of the pressing bump;
wherein the pressing bump and the pair of pivotal boards are pivotably connected to the opening end of the accommodating housing.

6. The foldable ergonomic keyboard as claimed in claim 5, wherein the locking assembly includes:
a pushing piece, one end of the pushing piece is formed a smooth portion, and the other end formed a post portion;
a sleeve; and
an elastic pressing piece; wherein the pressing bump of the latch member is against the smooth portion of the pushing piece; wherein the post portion of the pushing piece is inserted into the sleeve, and the sleeve is against the elastic pressing piece; wherein one end of the elastic pressing piece far away the sleeve is formed with a spherical cavity for partially receiving the spherical member.

7. The foldable ergonomic keyboard as claimed in claim 1, wherein the linking unit includes a pair of linking rods respectively connected to the pair of spherical members, and a linking tube connected the pair of linking rods.

8. A hinge mechanism, comprising:
a pair of operating modules, each operating module having:
  an accommodating housing formed with an opening end and a linking end, the linking end of the accommodating housing formed with a positioning slot;
  a locking assembly received in the accommodating housing;
  a latch member pivotably connected to the opening end of the accommodating housing and against the locking assembly to control the displacement of the locking assembly; and
  a spherical member received in the accommodating housing and against the locking assembly; and
a linking unit, having two ends respectively passing through the positioning slot of the linking end and connecting to the spherical member;
wherein the latch member is selectively arranged in a squeezed position and an adjusting position, the locking assembly following with the squeezed position of the latch member to press tightly the spherical member fixed in the accommodating housing, the locking assembly following with the adjusting position of the latch member to loosen the spherical member.

9. The hinge mechanism as claimed in claim 8, wherein each of the accommodating housings has a fixed board disposed at a periphery thereof.

10. The hinge mechanism as claimed in claim 9, wherein the opening end of the accommodating housing has an adjusting cutout formed opposite to the fixed board, and the opening end is U-shaped.

11. The hinge mechanism as claimed in claim 9, wherein the linking ends of the accommodating housings are hemispherical shaped, the positioning slot has a positional part passing through a top point of the hemispherical shaped linking end and extending far away the fixed board, a folding part communicated with the positional part, the folding part is formed on a spherical curve of the linking end and extended in a direction perpendicular to the fixed board.

12. The hinge mechanism as claimed in claim 11, wherein a width of the folding part is substantially equal to a diameter of the linking rod of the linking unit, wherein a width of the positional part is larger than a diameter of the linking rod of the linking unit and limits the rotating range of the linking unit.

13. The hinge mechanism as claimed in claim 8, wherein each of the latch members includes:
  a handle portion;
  a pressing bump formed on an end of the handle portion toward the accommodating housing; and
  a pair of pivotal boards formed at two sides of the pressing bump; wherein the pressing bump and the pair of pivotal boards are pivotably connected to the opening end of the accommodating housing.

14. The hinge mechanism as claimed in claim 13, wherein the locking assembly includes:
  a pushing piece, one end of the pushing piece is formed a smooth portion, and the other end formed a post portion;
  a sleeve; and
  an elastic pressing piece; wherein the pressing bump of the latch member is against the smooth portion of the pushing piece; wherein the post portion of the elastic pushing piece is inserted into the sleeve, and the sleeve is against the elastic pressing piece; wherein one end of the elastic pressing piece far away the sleeve is formed with a spherical cavity for partially receiving the spherical member.

15. The hinge mechanism as claimed in claim 13, further comprising a pin passing through the pair of pivotal boards, the opening end of the accommodating housing, and the pressing bump, thereby the latch member is pivotably connected to the accommodating housing.

16. The hinge mechanism as claimed in claim 15, wherein the pressing bump has a pressing surface and an adjusting surface, wherein the pressing surface is formed on an end of the pressing bump opposite to the handle portion, the adjusting surface is formed on an outside of the pressing bump; when the latch member is rotated, the pressing bump rotates along the pin as an axle and following the latch member, a distance between the pressing surface and the pin is larger than a distance between the adjusting surface and the pin.

17. The hinge mechanism as claimed in claim 8, wherein the linking unit has a pair of linking rods respectively connected to the pair of spherical members, and a linking tube connected the pair of linking rods.

* * * * *